United States Patent [19]

Magnusson et al.

[11] 4,102,230
[45] Jul. 25, 1978

[54] SOUND-DEADENING DEVICE FOR ROTARY SAW BLADES

[75] Inventors: Erik Börje Magnusson; Erik Inge Bertil Karlsson, both of Hallsberg, Sweden

[73] Assignee: Imk Industriservice AB, Hallsberg, Sweden

[21] Appl. No.: 731,779

[22] Filed: Oct. 12, 1976

[30] Foreign Application Priority Data

Oct. 16, 1975 [SE] Sweden .................................. 7511590

[51] Int. Cl.² ............................................. B27B 33/08
[52] U.S. Cl. .................................. 83/835; 51/206 R; 76/112; 83/676
[58] Field of Search ............... 83/835, 676; 76/101 A, 76/112; 51/206 R

[56] References Cited

U.S. PATENT DOCUMENTS

| | | | |
|---|---|---|---|
| 1,919,358 | 7/1933 | Bem | 76/112 |
| 2,563,559 | 8/1951 | Sneva | 83/835 |
| 2,624,381 | 1/1953 | Von Der Werth | 83/835 |
| 3,048,160 | 8/1962 | Griffin et al. | 51/206 R X |
| 3,363,617 | 1/1968 | Hoerer | 51/206 R X |
| 3,513,821 | 5/1970 | Bouvier | 51/206 R X |
| 3,799,025 | 3/1974 | Tsunoda | 83/676 X |

*Primary Examiner*—Frank T. Yost
*Attorney, Agent, or Firm*—Hane, Roberts, Spiecens & Cohen

[57] ABSTRACT

A rotary saw blade is provided with annular recesses on its two side surfaces, with the recess filled with a sound-deadening material such as melted metal. The sound-deadening material is sprayed into the recesses so that the entire saw blade need not be heated to any great degree. A layer of a binding material may also be sprayed into the recesses to increase the adhesion of the layer of melted metal to the rotary saw blade.

2 Claims, 4 Drawing Figures

SOUND-DEADENING DEVICE FOR ROTARY SAW BLADES

BACKGROUND OF THE INVENTION

The present application refers to a sound-deadening device for a rotary saw blade which cuts by means of its periphery and which has a centre hole for the fastening of the blade to a suitable driving device. A saw blade in operation makes a disturbing sound, and for a long time it has been a problem how to bring down the sound level. Many attempts have been made with a certain degree of progress. The body of the saw blade is usually homogeneous and, according to the Swiss Pat. No. 183,743, cuttings have been made in homogeneous saw blades and in accordance with the patent the cuttings have been filled with a lead alloy or an aluminium alloy. According to the patent, melted lead has been poured down into the cuttings and then the surface of the saw blade has been made plane and smooth. This must be a troublesome and complicated operation as saw blades, in accordance with the patent, have not emerged on the market in spite of the fact that the requirement for a sound deadening is very great today, and in spite of the fact that there is very heavy pressure from environmental authorities. Another way of reducing the sound level has been to employ two saw blades, which have been put on each other, and then welded together, or glued to each other. From an economic point of view, this has not been a favourable method because when such a blade has become crooked it is very difficult to straighten, and therefore the blade will, in most cases, be discarded.

SUMMARY OF THE INVENTION

The purpose of the present invention is to produce sound deadening for saw blades in the same way as the Swiss Pat. No. 183,743, but different from the Swiss patent in the way in which a metal is placed in the cuttings in the saw blades. The cuttings are sprayed with a melted metal in the form of drops. This spraying can be carried out on one side or on two sides at the same time. This spraying can be controlled in such a way, if desired, that exact quantities of metal are applied to each recess in the saw blade, and in this way the filling of the recesses is made considerably cheaper. The spraying has the advantage that the amount of possible filling material increases. The effect of this is that an alloy which can not be used in foundry, can be used. Further, it is also possible with spraying to use filling material with a higher melting point than at foundring.

A suitable metal for filling of the recesses would be zinc, but it is obvious that any other metal as lead, cadmium and cooper, or an alloy thereof can be used provided that the saw blade filled with the metal in question has a sound deadening effect. Prior to each spraying in a recess, a binding layer must be applied to the recess in order to obtain a better adherence for the before-mentioned spraying of melted metal. The binding layer may consist of a compound of nickel and aluminum.

According to the invention, each recess can be shaped in such a way that when it has been filled with metal it will not be able to escape from the recess because of the fact that the walls of the recess are for instance, granulated or sloping. The cross section of the recess may also be dovetailed.

The recesses can suitably be annular and they could be situated on one or both of the surfaces of the saw blade.

BRIEF DESCRIPTION OF THE DRAWING

The present invention will be described in detail in connection with the enclosed drawings wherein.

DETAILED DESCRIPTION OF THE INVENTION

Figure 1:
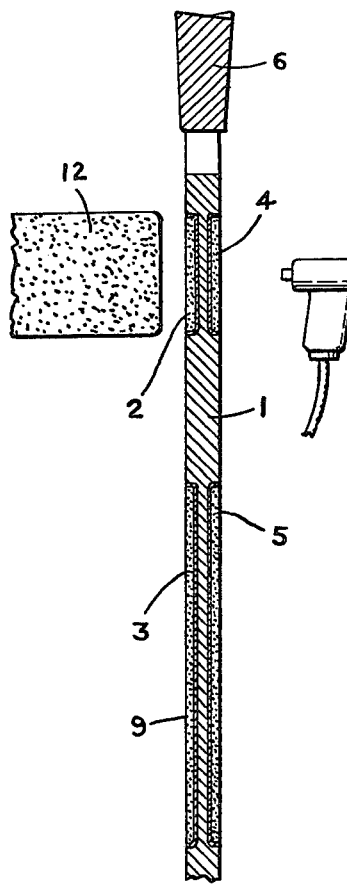
FIG. 1 shows a saw blade with annular recesses and in cross section; wherein where

In the figures is shown a saw blade 1. On the left-hand surface of the saw blade two annular recesses 2 - 3 have been made. The other side of the saw blade has also been provided with two annular recesses 4 - 5, which are situated directly opposite the recesses 2 - 3. In its periphery the saw blade is provided with a cutting edge 6 and a center hole 7 for fastening of the blade to a suitable, not shown driving device. Work table 12 in FIG. 1 supports the piece which is to be cut by the saw blade 1.

Figure 2:
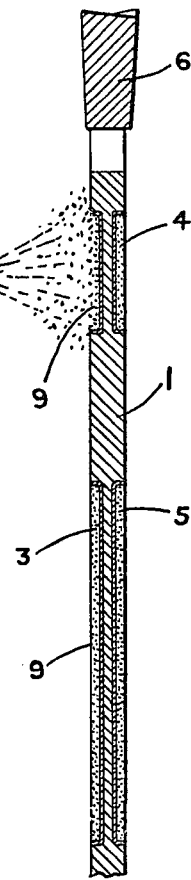
FIG. 2 shows the same saw blade as in FIG. 1 where a recess is being sprayed with melted metal.
Figure 3:
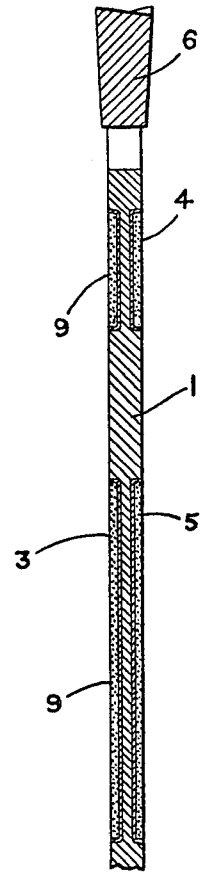
FIG. 3 shows the same saw blade as in FIG. 1 but where all of the annular recesses have been filled.
Figure 4:
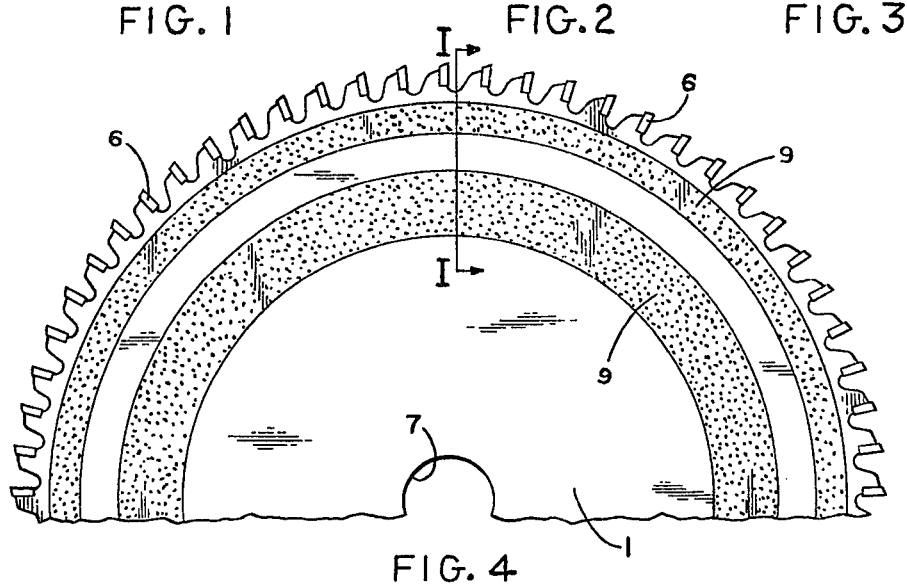
FIG. 4 shows a saw blade seen from the side and with filled recesses.

Each recess 2 - 5 will be filled, through spraying, with melted metal. In FIG. 2 is shown a spray gun 8. To this will be supplied metal powder or metal wire. The wire and the powder will be melted in the pistol and the melted metal will leave the pistol in the form of drops. The pistol has been set so that it will fill the recess 2 with an even layer 9.

The melted metal can be any suitable metal provided that the blade fitted with melted metal in the recesses 2 - 5 has been considerably sound deadened. A suitable metal for this purpose is zinc. The method of applying metal to objects in the way described is called flame spraying or thermal spraying. Prior to the spraying with melted metal, it is advisable to pre-spray with a compound of melted nickel and melted aluminum. By means of the spraying of a binding layer, the adherence of the subsequent melted metal will be increased. After the filling of the recesses 2, the recesses 3, 4, and 5 will be filled in the same way. The recesses could be made in such a way that both walls and bottom are granulated, and further the openings of the recesses could be smaller than the bottoms of the recesses.

It is obvious that the periphery of the saw blade can be formed in any way whatsoever, provided that a cutting effect is obtained by means of the periphery of the saw blade.

We claim:

1. In a rotary saw blade having a cutting periphery and having a center hole for mounting on a drive shaft, said rotary saw blade having a first side surface and a second side surface defining therebetween the cutting periphery, wherein the improvement comprises: at least one annular recess formed on each of said first and second side surfaces, each of said recesses being filled with a first layer of a melted binding metal in order to increase adhesion and a second layer of one of a melted metal and a melted alloy, said second layer being situated outside of said first layer so that said second layer is flush with the outside portion of the respective side surface, wherein a sound-deadening effect is achieved in the rotary saw blade when it is in use.

2. The improvement according to claim 1 wherein said first layer is made of a nickel-aluminum alloy.

* * * * *